US005612673A

United States Patent [19]

Nunn

[11] Patent Number: 5,612,673

[45] Date of Patent: Mar. 18, 1997

[54] EMERGENCY VEHICLE SIREN CIRCUIT SYSTEM

[75] Inventor: Ewing D. Nunn, Yorba Linda, Calif.

[73] Assignee: Dunbar-Nunn Corporation, Anaheim, Calif.

[21] Appl. No.: 409,205

[22] Filed: Mar. 23, 1995

[51] Int. Cl.[6] .............................. B60Q 1/52; G08B 3/10

[52] U.S. Cl. ......................... 340/471; 340/472; 340/456; 340/384.1; 340/384.4; 340/384.5; 340/384.7

[58] Field of Search ................................... 340/471, 468, 340/472, 473, 456, 464, 433, 902, 904, 384.1, 384.4, 384.5, 384.7

[56] References Cited

U.S. PATENT DOCUMENTS

| | | | |
|---|---|---|---|
| 4,265,047 | 5/1981 | Meyer et al. | 46/232 |
| 5,140,304 | 8/1992 | Miller | 340/384.4 |
| 5,296,840 | 3/1994 | Gieffers | 340/468 |

*Primary Examiner*—Donnie L. Crosland
*Attorney, Agent, or Firm*—George F. Bethel; Patience K. Bethel

[57] ABSTRACT

An emergency vehicle multiple sound siren disabling circuit is disclosed having a multiple sound siren circuit for emanating signals equivalent to a particular type of sound with an amplifier adapted for connection to a speaker. The siren circuit has a switch for selecting respective siren sounds and a circuit for disabling the multiple sound siren when the emergency vehicle transmission is placed in a park or neutral position. The circuit further disables the multiple sound siren after the emergency vehicle transmission is removed from the park or neutral mode, and enables it again after selective inputs thereto.

17 Claims, 5 Drawing Sheets

EMERGENCY VEHICLE SIREN CIRCUIT SYSTEM

BACKGROUND OF THE INVENTION

1. Field of the Invention

This invention relates to emergency vehicle sirens. It specifically relates to electronic sirens which are operated by actuating a circuit which can provide certain frequencies to an amplifier which then amplifies and broadcasts siren sounds through a speaker. Accompanying the siren is a control circuit and panel generally mounted within the emergency vehicle for selecting certain siren tones and placing the siren in various operational modes.

2. Prior Art

The prior art with regard to electronic circuits for sirens incorporates such sirens as those that were originally only of a wail tone. As sophisticated siren requirements developed, sirens were created that provided not only a wail tone but also a yelp tone and a hi-lo tone. These respective tones are known and appreciated by emergency vehicle operators and have been substantially met with acceptance by the general public as a warning of an approaching emergency vehicle.

The general structure of emergency vehicle sirens comprise a switch panel or circuit mounted within the emergency vehicle. The switch panel and circuit mounted in the emergency vehicle oftentimes was placed under the dashboard of an emergency vehicle. The output of the circuit which provided the tonal nature of the sound was received by a power amplifier which in turn was connected to a speaker for emanating the siren sound.

Oftentimes, it was desirous to have a siren sound of a particular nature such as wail, yelp or hi-lo emanate from the siren by manual control. On the other hand, sometimes an automatic control was implemented of the particular siren sound. All of these controls could be handled by selector switches mounted on the control panel. The selector switches have developed over the years with various circuitry functions to provide various outputs and control functions.

One particular selector function has allowed a tone to emanate from the siren such as a police vehicle until the vehicle is stopped and the transmission is placed in park or neutral. At this point, the siren sound ceases while the officer or driver of the emergency vehicle attends to business with a particular party whom he has apprised by the siren tone.

Upon re-entering the vehicle, the officer or individual driving the emergency vehicle has put the vehicle from neutral or park into a position for driving at which time the siren again emanates its tone. This has caused surprise at the least and extreme annoyance and impromptu responses from the driver of the emergency vehicle or the party being warned such that an accident or other discomfiture could take place.

This particular invention allows for an elimination of the problem of a siren sound emanating when the emergency vehicle is placed in a drive mode from the neutral or park mode. This is due to the switch function which turned off the siren sound not reactivating the siren sound. The overall development of this particular siren elimination or disabling function upon positioning of the shift lever into drive or park enhances emergency vehicle activity as well as the related siren functions as will be seen hereinafter.

SUMMARY OF THE INVENTION

Summarily stated this invention comprises an emergency vehicle siren which can be deactivated or disabled by placing the vehicle's shift lever into a park or neutral position and which will not be reactivated upon placing the shift lever into a drive or driving mode.

More specifically, the invention comprises a multiple sound siren. The multiple sound siren has a plurality of siren functions such as manual, wail, yelp, hi-lo, and/or operation compatibility with the horn ring, horn switch or horn circuit. The siren can be switched by a siren selector switch to the different respective modes.

Connected to the siren selector switch are a number of circuit logic components that allow for an input to a multiple sound siren. The multiple sound siren is in turn connected to a power amplifier that is also connected to a speaker for the respective output of the siren sound.

A logic and memory circuit, or a micro computer is provided that can be in the form of an integrated circuit having computerized functions. It is connected to the multiple sound siren for control through a series or components such as "and," and "or" gates. This can provide for an output dependent upon the position of the siren selector switch and the placement of the park and neutral switch of the drive system of the emergency vehicle.

The park and neutral switch of the drive system of the emergency vehicle is in turn connected to the integrated circuit in a manner to latch or create a function for curtailing the output of the multiple sound siren. This takes place when the siren selector switch is in a particular functional position mode that creates a siren sound. The disabling of the output of the multiple sound siren by the integrated circuit receiving the output of the park/neutral switch provides for elimination of the siren sound after resumption of the park/neutral switch being un-switched and the vehicle being placed into a drive mode.

The foregoing circuit functions can also be provided in great measure by a microprocessor circuit.

After the park/neutral switch is opened, the integrated circuit further provides for automatically returning the siren to normal operation when the operator moves the siren sound selector switch to a different position.

DESCRIPTION OF THE PREFERRED EMBODIMENTS

Figure 1:
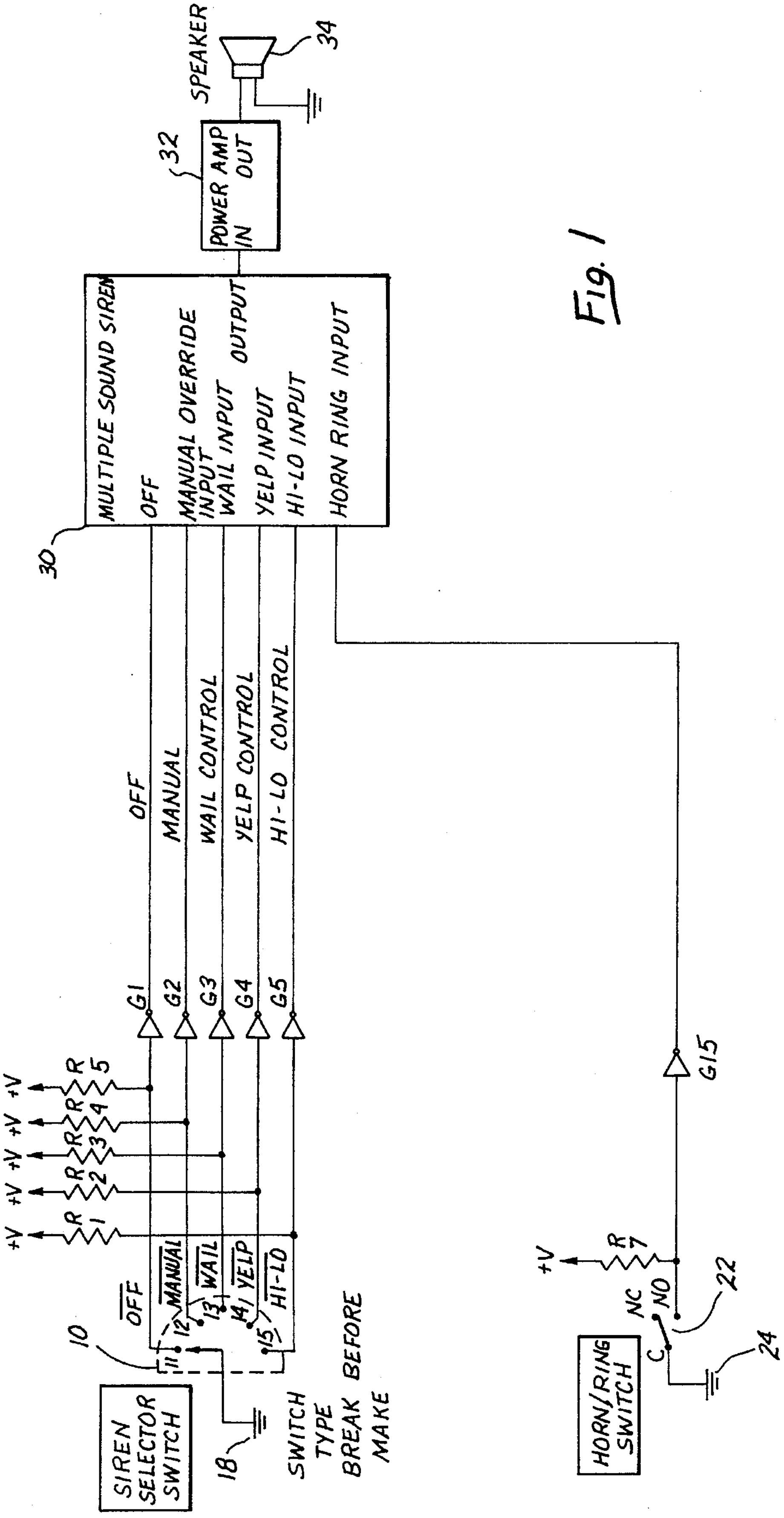
FIG. 1 shows a simplified electronic siren circuit of the prior art.

FIG. 1 shows a siren circuit of the prior art without a siren disabling feature of this invention.

A siren selector switch 10 is mounted on the panel of the siren console mounted on the dash board of the vehicle but can be mounted in other locations. The siren selector switch 10 is shown as having multiple switch positions 11, 12, 13, 14, and 15 such as a rotary switch. The multiple switch positions provide various modes of siren operation at various positions. For instance in position 12 a manual siren mode is provided and in position 13 a wail mode is provided.

The switch 10 for purposes of electrical installation is generally installed in an emergency vehicle with a ground point 18. The contacts of the switch positions 11 through 15 are connected to resistors R1 through R5. These resistors provide a pull-up resistor function.

As a simple illustration, multiple switch position outputs 11 through 15 can be provided to effectuate larger numbers of siren sounds other than wail, yelp and hi-lo tones. Also, other switch positions can be utilized. However, for purposes of this illustration when the switch 10 is in position 11, the siren is placed in an off condition. In position 12 the siren is in the manual override mode. In this mode, sound is generated when the driver presses the horn ring or the horn switch which is in the vehicle. The horn switch can be referred to as the horn ring switch or the horn ring. This can be seen as a horn ring switch 22 which is grounded at ground 24. The horn ring switch has an open and closed position and is connected to a pull-up resistor R7, and an inverter G15 which performs the-like logic functions of the inverters G1 through G5 described herein.

When the selector switch 10 is in positions 13, 14 or 15, the siren generates one of the three sounds as indicated respectively wail, yelp and hi-lo. All of these three sounds are continuous. For purposes of understanding, the sound known as wail is the sound originally made by mechanical sirens before the advent of electronic sirens. The hi-lo sound is a sound more familiar with European vehicles which has been adopted in the U.S. The yelp sound is a higher frequency sound similar to the wail sound.

When looking at the pull-up resistors R1 through R5, it can be seen that they provide a low logic level at each switch 10 position when that function is selected and a high logic level when they are not. For purposes of logic, a high level is considered to be a 1 and a low level a 0.

Inverters G1 through G5 provide positive true logic levels where a high logic level indicates that a switch function or siren sound has been selected. When the low logic level has been selected by virtue of the switch 10 being turned to a particular position due to the ground 18 and the pull-up resistors R1 through R5, a zero is seen at the inputs of respective inverters G1 through G5. This inversion allows the inverters to put out a true 1 when the logic level has been selected by the switch. The reason for the foregoing components is to allow for a vehicle connection to ground 18 for ease of emergency vehicle and vehicular connections.

As a further example, if the siren selector switch 10 is in position 13, the input to the inverter G3 is low and the output is high. The position 13 provides for a wail input to a multiple sound siren 30. The wail input for the multiple sound siren 30 is then high and the other 4 inputs are low. The output of the multiple sound siren 30 which is an electrical signal corresponding to the wail sound and frequency is then provided to an amplifier 32. The output of the amplifier 32 to a siren speaker 34 allows for the emanation of the siren sound in the wail tone which has been selected.

Figure 2:
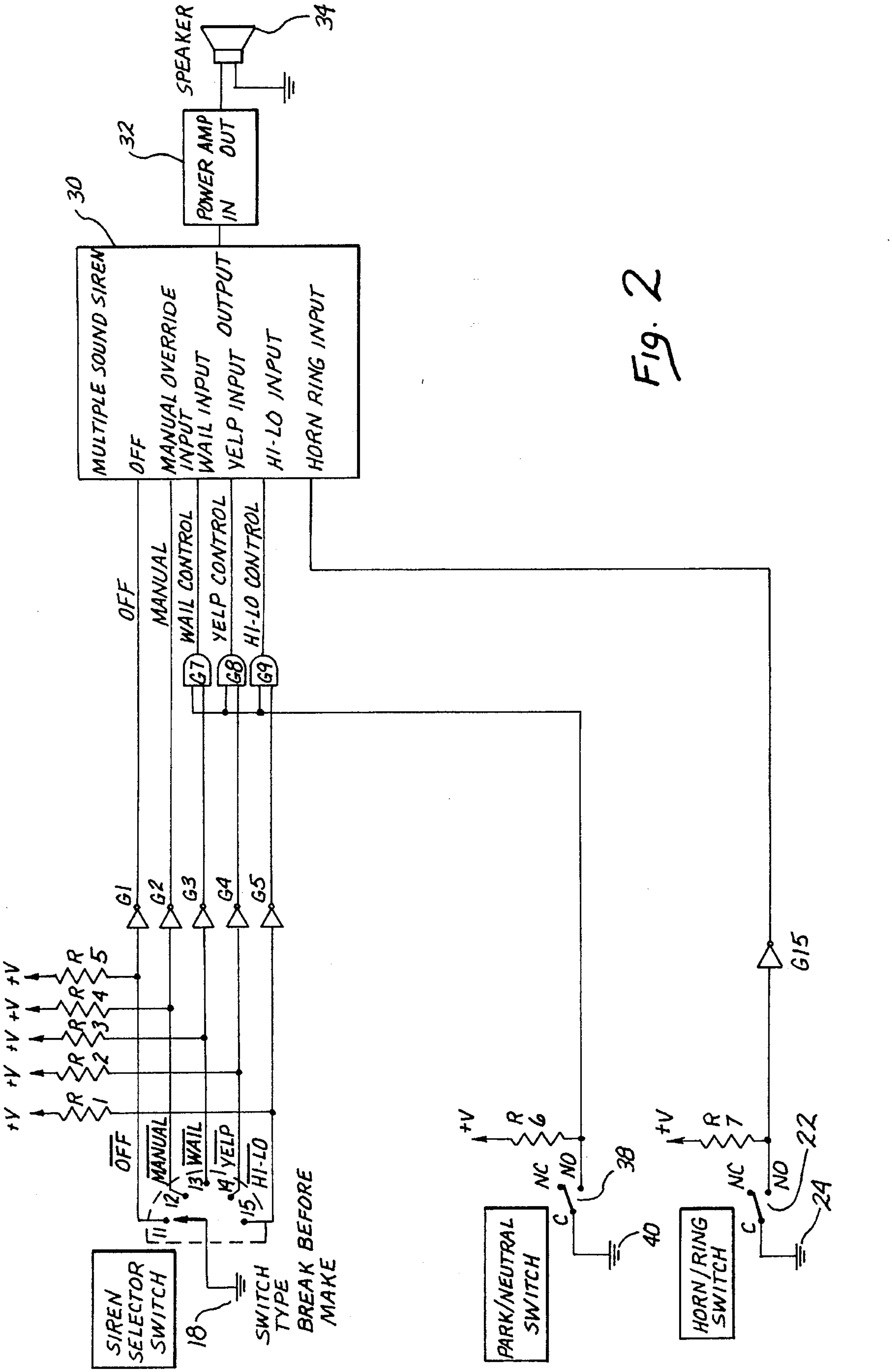
FIG. 2 shows a siren circuit of the prior art having a siren curtailing function when the vehicle's park/neutral switch is closed.

Turning now to FIG. 2 which shows a siren disabling circuit it can be seen that components similar to FIG. 1 are shown. These include the siren selector switch 10, the switch positions 11 through 15, the pull-up resistors R1 through R5, and the inverters G1 through G5. Also, the horn ring switch has been shown in the form of horn ring switch 22 connected to a pull-up resistor R7 and an inverter G15.

The basis for the siren disabling circuit shown in FIG. 2 is that when the driver of an emergency vehicle desires to stop the vehicle and leave it quickly, he often does not want the siren to continue making a sound. This of course can be when a police vehicle has stopped a party, or when a fire truck or 911 emergency vehicle such as a paramedic vehicle has stopped. The siren disabling feature of this particular circuit cures the problem by automatically shutting off the siren when the transmission of the emergency vehicle is shifted into neutral or park. This is an event that usually happens before an officer or emergency vehicle personnel leave the vehicle.

As can be seen from the showing of FIG. 2, the emergency vehicle park/neutral switch has been shown as switch 38 that has been grounded by ground 40. This switch has a pull-up resistor R6.

The implementation of the siren disabling function is by the switch 38 closing as previously stated. The closure of switch 38 disables the siren when the vehicle is stopped. There can be numerous ways of implementing the technique of using the park/neutral switch 38 which can exist in a vehicle or can be mounted in a vehicle.

The implementation of FIG. 2 is merely for descriptive purposes and should not be considered exclusive. Other switch closures analogous to switch 38 can be utilized including switch modes and integrated circuits connected through the park/neutral switch 38 or in connected relationship to the lever of an emergency vehicle that places the vehicle in park or neutral. Also, various integrated circuits, circuit components, electromechanical and mechanical latches can be utilized to enhance the switch opening and closing in an analogous function to interrupt or close a circuit when the transmission is placed in park or neutral.

In order to implement the siren disabling feature of the park/neutral switch 38, a pull-up resistor R6 and gates G7, G8 and G9 are utilized. These features are added to what was shown as a simple siren circuit of FIG. 1.

If the selector switch 10 is in positions 11 or 12, no siren sound will be heard when the driver leaves the emergency vehicle. This is true inasmuch as the siren is either in an off mode or must be activated by the manual horn ring of switch 22.

The gates G7, G8 and G9 will prevent siren operation when the park/neutral switch 38 is closed in the event the siren selector switch 10 is in positions 13, 14 or 15. This is due to the gates G7 through G9 being AND gates. In effect, a signal must be received from both the siren selector switch 10 in one of the positions such as 13, 14 or 15 and from the park/neutral switch 38. This means that a 1 would be seen at both inputs of the gates G7 through G9 to provide for a positive or 1 signal at the output of the gates. If the park/neutral switch 38 is closed by virtue of being in neutral or park, there is no positive signal at the upper inputs of the AND gates G7 through G9 which eliminates the ability to have the tones of wail, yelp or hi-lo actuated.

When the vehicle is being driven, the park/neutral switch 38 is open. This causes the upper input of each AND gate connected to the switch to be high allowing outputs of gates G7, G8 or G9 to be applied to the respective wail, yelp and hi-lo inputs of the multiple sound siren 30. Again, when the vehicle is stopped and the shifter is in the park or neutral position, the park/neutral switch 38 is closed, causing one of the inputs of each AND gate G7 through G9 to be low. This therefor causes the logic level signals to not provide the AND gate functions so that whatever the position of the switch selector 10 is selected to, will not cause a sound from the multiple sound siren 30.

By way of an example, consider that when an emergency vehicle is in pursuit, the park/neutral switch 38 is open. By further example, consider the selector switch 10 being in position 13 which provides for the wail output. The input of inverter G3 will be low, and the output of inverter G3 and the lower input of AND gate G7 will be high. Resistor R6 pulls up the other input of AND gate G7 so that the output of G7 for the wail input of the multiple sound siren 30 will be high, and therefor the speaker emits the wail sound.

After the emergency vehicle is stopped, and the shift lever is placed into park, the park/neutral switch 38 closes. At this point, the upper input of gate G7 goes low. The output of AND gate G7 and the wail input of the multiple sound siren 30 goes low, and the siren is automatically silenced or disabled.

Figure 3:
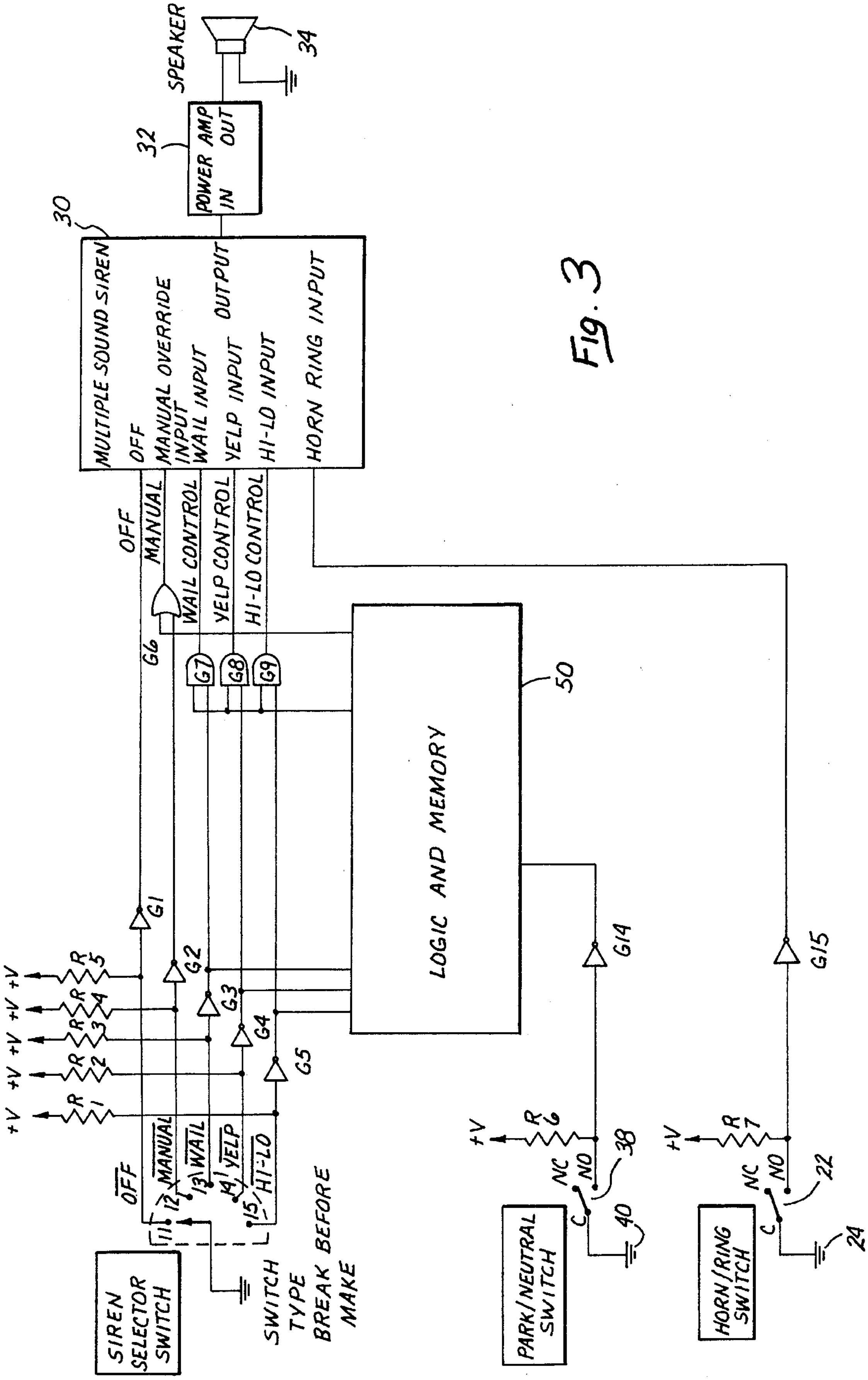
FIG. 3 shows the siren disabling circuit of this invention with a portion of the attendant logic and memory in an integrated circuit.
Figure 4:
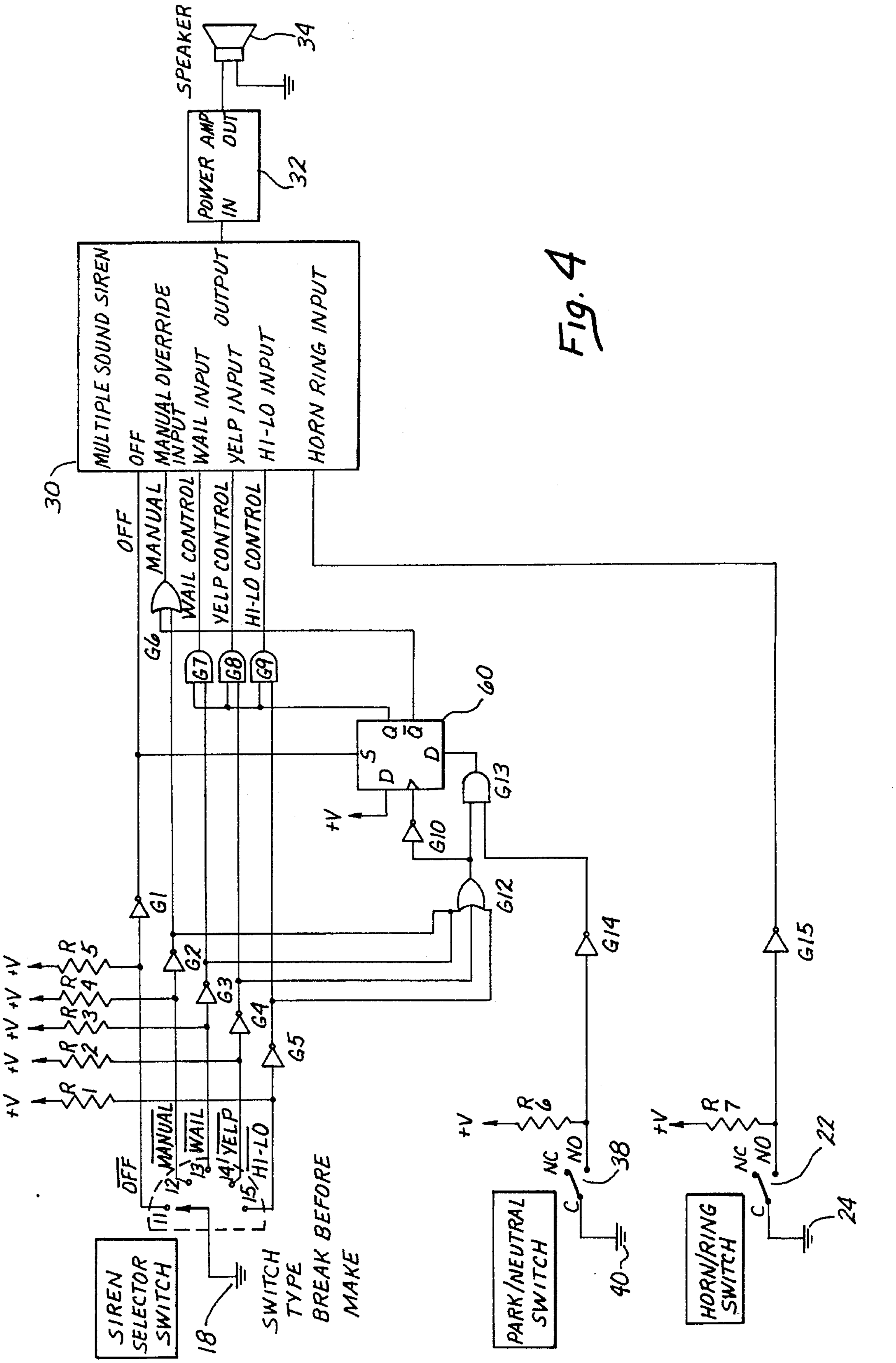
FIG. 4 shows an analogous circuit to FIG. 3 detailing the operative components that can be used to cause the park/neutral switch to disable the multiple sound siren and at a later point maintain the disablement after the park/neutral switch is disconnected.

Looking at FIG. 3 in light of the prior art as well as FIG. 4, it can be seen that this invention solves the problem as enunciated in the background of this invention and the description of the prior art hereinbefore. Fundamentally, the problem with the previously described implementation is that unless the user of an emergency vehicle remembers to disable the siren upon his return, when he attempts to drive away, the siren comes on as soon as the transmission is shifted from park or neutral into a drive position. The return of the siren sound can then be a significant problem if the user or those surrounding him including those who have been hailed are not aware of it. When looking at FIGS. 3 and 4, it can be seen that the siren selector switch 10 is also shown with the respective switch positions 11 through 15.

The circuit which is the invention hereof resolves the foregoing problem by automatically switching the multiple siren sound 30 to the manual mode and leaving it in this mode until the user actively re-enables the siren. The net result is that upon return to the emergency vehicle and shifting the park/neutral switch 38 into an open position, the siren will not sound until the user changes the siren selector switch 10.

In order to accomplish the capability of the invention to disable the siren 30, the circuit must continue to lock it in the manual mode after the park/neutral switch 38 has been opened. In order to do this, memory and additional circuitry is provided in the form of the logic and memory chip 50. Also, in order to enable the siren from the disabling function, a change of the siren selector switch 10 provides a pulse or a clocking pulse necessary to re-enable the siren.

Looking more particularly at FIG. 3 it can be seen that an OR gate G6 has been provided. The OR gate G6 provides the capability of applying a manual override siren input regardless of the position of the siren selector switch 10. The outputs of inverters G3, G4, G5 and G14 supply their signals to the logic and memory circuit 50 which is an integrated circuit. An output from the logic and memory circuit 50 to gates G7, G8 and G9 and another to G6 provide the control signals for the siren.

This is more clearly explained by presenting an example such as when the siren selector switch 10 is in the wail switch position 13.

Again, looking at FIG. 3 when the park/neutral switch 38 is closed, the pull-up resistor R6 provides a zero at inverter G14 with an output of a 1. This output 1 provides a signal to the logic and memory circuit 50 to latch the output signals to gates G6 through G9. As in the circuit of FIG. 2, the upper inputs of G7 through G9 are latched low, blocking the logic signals from the selector switch 10. The upper input of OR gate G6 is latched high, which puts the siren in the previously described manual mode. As long as the park/neutral switch is closed, the siren will not make a sound regardless of what the operator does with the siren selector switch 10. Since the siren is locked in the manual mode, however, the operator can cause the wail sound by pressing on the horn ring and thereby closing the horn ring switch 22.

Later when the park/neutral switch 38 is opened by the operator shifting to a drive gear the inputs to, the siren will still be null regardless of the position of the selector switch 10. Upon movement of the siren selector switch 10 such as if the siren selector switch 10 were in the wail position 13, and the operator moved it to the yelp position 14, because the switch 10 is of the break-before-make type, the input of G3 will go briefly from a zero to a 1 while the wiper of switch 10 is between positions 13 and 14. This gives rise to a positive going step at the input of inverter G3 which applies a negative going step to the integrated circuit 50. A negative going step at the output of G3, G4, or G5 will reset the outputs of the integrated circuit 50 to the original states that existed before the vehicle was put into park or neutral. The upper input to OR gate G6 is now low, and gates G7 through G9 are enabled and the siren will now respond in a normal manner to the selector switch 10. This latch is retained until the vehicle is again stopped and put into park or neutral.

FIG. 4 shows a schematic of an implementation of the siren disabling circuit of this invention without a programmed integrated circuit. The embodiment of FIG. 4 like the foregoing figures has a siren selector switch 10 with the respective terminals or switch positions 11 through 15. The inverters G1 through G5 as well as the pull-up resistors R1 through R5 are also shown.

It should be understood that there are many implementations that are possible. In this particular instance, the latches and logic circuitry are shown for purposes of understanding. However, other solid state circuitry, integrated circuits in the form of certain logic outputs, ASICs, and other forms can be utilized. Also, it should be understood that the multiple sound siren 30 can be implemented with discrete components. In this case the siren 30 is in the form of an integrated circuit which puts out a given signal tantamount to the respective wail, yelp or hi-lo outputs for amplification by the amplifier 32.

The selector switch 10 is shown as a rotary switch. However, other types of switches such as a digital input switch modified for the circuit, a slide selector switch, a series of touch switches and switches of any other type other than the rotary switch 10 can be used so long as they are conditioned or compatible with the remainder of the circuit. Also, as previously stated the multiple sound siren 30 can be implemented using a microprocessor or a number of other discrete circuits as in the prior art.

In the showing of FIG. 4, a flip flop 60 is used. In normal operation, the flip flop 60 is in the set state. In this state, the Q output is high, enabling gates G7, G8 and G9. This allows the wail, yelp and hi-lo inputs to the multiple sound siren 30 to respond to the siren selector switch 10. The Q not output is low meaning G6 is enabled and the manual input will respond normally to the siren selector switch 10.

At this point, the output of G1 is connected to the SET input of the flip flop 60 so that the flip flop is put into the SET state whenever the siren selector switch 10 is switched to the off position.

If the siren selector switch 10 is in any position but off one of the inputs to OR gate G12 will be high making its output high thus enabling gate G13.

Presuming the situation where an emergency vehicle has its siren operating during a pursuit and hailing of a party or movement to a scene of activity such as a fire truck or paramedic facility, consideration should thereby be given to the following. In this particular mode, the flip flop 60 is in the SET state and the output of gate G3 would be high which makes the output of G12 high. This would be when the wail sound is being effectuated and the switch is on the wail terminal 13.

When the operator of the emergency vehicle stops the vehicle and puts it in park, the output of gate G14 goes high. At this point, both inputs to gate G13 are high causing the output of G13 to go high and reset the flip flop 60. In this reset state, the Q output of flip flop 60 is low. Consequently, one of the inputs to gate G7 and the output of gate G7 are both low and the siren 30 is silent in the wail position 13. Also, the upper input of gate G6 goes high and the siren 30 is in the manual mode.

When the operator of the emergency vehicle later starts the car and shifts into drive thereby opening the park/neutral switch 38, the outputs of gates G14 and G13 both go Low, but this has no effect on the flip flop 60. Consequently, the multiple sound siren 30 remains in the manual mode.

The siren will remain in this disabled mode so that it can only be operated manually until the operator moves the siren selector switch 10 to another position. This provides a pulse or clocks the flip flop 60 into the set state in the following manner. All of the inputs to gate G12 are low except the output of gate G3. As the arm of the switch moves from position 13 to any other such as position 12 or 14, because of the fact that the switch is a break before make switch there will be a brief period when all of the contacts 11 through 15 will be ungrounded. All the outputs of the 4 inverters connected to gate G12 will be low. This causes a short negative pulse at the output of gate G12. The output of inverter G10 is a positive pulse which clocks or pulses the flip flop 60. This pulse causes the Q output (which was low) to assume the level of the D input which is high. Thus the flip flop 60 is locked into the set state and the system has been returned to its normal state. At this point, the multiple sound siren 30 now responds to the siren selector switch 10.

All of the foregoing functions can be carried out by the circuit 50 of FIG. 3 that have been mentioned with regard to the flip flop 60. Numerous alternatives can be utilized in latching and disabling the multiple sound siren 30 and then allowing it to be enabled through the pulse or any other output when the siren selector switch 10 is moved.

Figure 5:
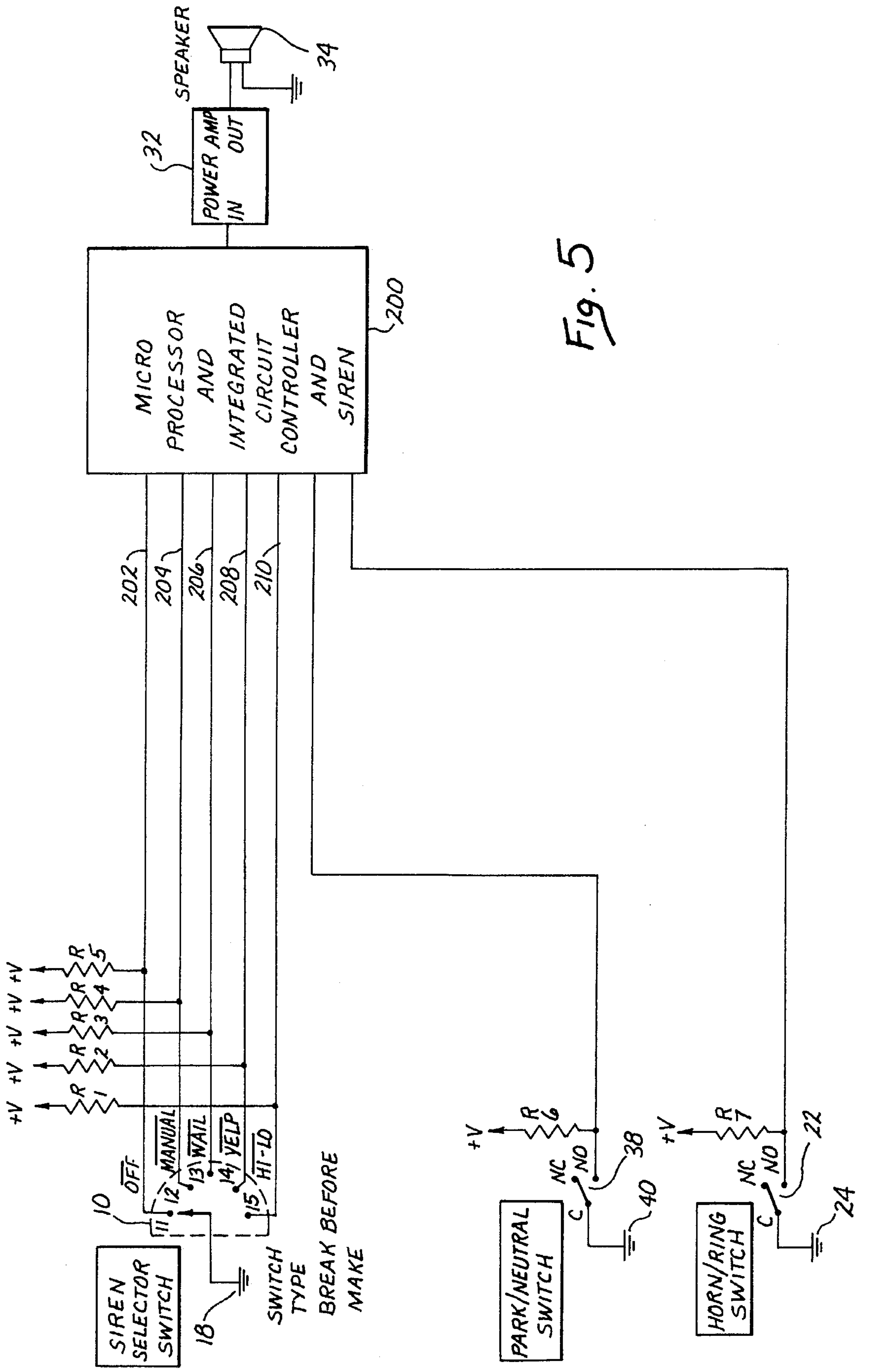
FIG. 5 shows a circuit which will perform the function of this invention incorporating a microprocessor.

Looking more particularly at FIG. 5, it can be seen that an alternative circuit is shown. This alternative circuit incorporates the siren selector switch 10 as previously shown. The selector switch incorporates the ground break to make function. The switch positions 11 through 15 respectively incorporate the off, manual, wail, yelp and hi-low terminal positions. These respective terminal positions are connected to pull-up resistors R1 through R5 as in the previous circuit.

The park/neutral switch 38 is incorporated having a ground 40 and a switch function with a pull-up resistor R6.

The horn ring switch is also incorporated, namely horn ring switch 22 with a pull-up resistor R7.

The foregoing switches function in the same manner as previously stated by allowing various siren functions to be implemented through the siren selector switch 10. Also, the park/neutral switch 38 functions are effected in the same manner. However, it should be understood that the position of the park/neutral switch 38 can be utilized to indicate that the siren is to be on or off depending upon the circuitry. In other words, when the park/neutral switch is in the closed position it can be utilized to trigger the circuit so as to indicate that the vehicle is in park or neutral or in the alternative in the open position to indicate that it is not in park or neutral. The foregoing functions can be reversed depending upon the circuitry, polarity and other related aspects in whatever manner the circuit designer cares to implement the functions. Also, it should be noted that the horn ring switch 22 implements the operation in the manner previously stated so that a manual override can be undertaken. Finally, the make to break function of the siren selector switch 10 serves to implement the circuit from the standpoint of making a selection and also once the siren has been disabled, providing the same pulse or output between the make to break positions so that the circuit will go back to its normal mode to allow for the particular siren position to be selected and implemented.

The foregoing functions enunciated in the prior description are similar as to this microprocessor embodiment.

However, an integrated circuit controller siren circuit 200 is shown. This circuit fundamentally comprises a microprocessor 200. The microprocessor 200 is programmed to provide a siren signal at its output analogous to whatever switch position of switch 10 has been connected. To effectuate this, lines 202, 204, 206, 208, and 210 connected to the switch 10 are connected to the microprocessor 200. These connections to the microprocessor 200 allow the input to the microprocessor to indicate the respective siren function.

Upon the siren functional position being received at the microprocessor 200, it puts out a signal or siren wave form to the power amplifier 32 for purposes of creating the siren signal through the speaker 34. When the park/neutral switch 38 is in the open position, the microprocessor 200 provides for the siren to function in its normal operation. This effectively allows the microprocessor 200 to then put out the particular siren signal or wave form as selected on lines 202 through 210.

The horn ring switch 22 is connected also to the microprocessor 200 so as to allow for the function of the horn ring to override and allow for the particular siren position selected by the siren selector switch 10 to be emanated in the form of a signal from the microprocessor 200 to the power amplifier.

When the park/neutral switch 38 is closed, it signals the microprocessor 200 not to put out any type of siren signal. After the park/neutral switch 38 is opened, the microprocessor 200 further inhibits or disables a siren signal until the siren selector switch 10 moves to a different position. The change in signals on lines 202 through 210 re-establish the microprocessor 200 for purposes of allowing or enabling the siren signal to emanate. The microprocessor contains memory and logic functions such that it can detect a change in the selector switch position with or without the previously described pulse caused by the use of a break before make switch.

It can be seen that the microprocessor 200 performs all the functions of the circuitry required for this invention as in the multiple sound siren 30 and the gating and circuit functions previously described. This is done by programming the microprocessor 200 in a manner which is necessary in order for it to provide the signal functions, as well as receive the signals from the park/neutral switch 98, horn ring switch 22, and siren selector switch 10 for selecting, inhibiting, or disabling and then enabling the siren in the manner as set forth.

As a consequence, this invention should be read broadly as incorporating the functions of the invention as seen and claimed.

I claim:

1. An emergency vehicle siren and disabling circuit comprising:

a siren circuit for providing signals for a siren sound;

amplification means connected to said siren circuit to amplify said signals from said siren circuit;

park/neutral switch means connected to said siren circuit and the transmission of a motorized emergency vehicle for disabling said siren circuit when said emergency vehicle transmission is placed in a park or neutral position;

means for further disabling said siren circuit after said emergency vehicle transmission is removed from said park or neutral position;

means for enabling said siren circuit automatically after the park/neutral switch is actuated and the emergency vehicle operator selects a siren sound; and, wherein said disabling and enabling means comprise a microprocessor connected to said park/neutral switch means and forming at least a part of said siren circuit.

2. The siren circuit as claimed in claim 1 further comprising:

said siren circuit having multiple signal modes for multiple siren sounds; and, means for selecting respective multiple siren sounds of said siren.

3. The siren circuit as claimed in claim 2 wherein:

said means for selecting multiple siren sounds comprise selector switch means.

4. The siren circuit as claimed in claim 3 wherein:

said selector switch means comprise a rotary switch having multiple contacts.

5. The siren circuit as claimed in claim 3 further comprising:

an input to said multiple sound siren connected to a horn ring switch for manually actuating said multiple sound siren.

6. The siren circuit as claimed in claim 1 comprising:

selector switch means having multiple switch positions connected to ground and to said siren circuit;

resistors connected to said selector switch means for pulling up the voltage when said switch means is operatively connected thereto; and, inverters connected to each of said multiple selector switch positions.

7. The siren circuit as claimed in claim 6 further comprising:

an AND gate connected to the output of the selector switch means and said integrated circuit for providing an output when said AND gate is gated for signaling said siren circuit for the operation thereof.

8. A siren with a controlling and disabling circuit for an emergency motorized vehicle comprising;

a microprocessor for providing multiple sound siren signals;

means for amplifying said siren signals;

a first switch means for switching to various siren signals;

park/neutral switch means connected to said emergency motorized vehicle transmission for indicating when said vehicle is in park or neutral, and connected to said microprocessor;

means in said microprocessor for disabling said multiple sound siren signals connected to said park/neutral switch means;

means in said microprocessor for further disabling said multiple sound siren when said park/neutral switch means is moved out of said park or neutral position; and, wherein said microprocessor enables said multiple sound siren signals upon movement of said first switch means.

9. The circuit as claimed in claim 8 wherein:

said park/neutral switch means comprise a switch which closes when said transmission is placed into park or neutral.

10. The circuit as claimed in claim 8 further comprising:

a horn ring switch connected to said microprocessor for operating said multiple sound siren by said horn ring switch.

11. The circuit as claimed in claim 10 further comprising:

pull up resistors connected to the outputs of said first switch means.

12. A method for providing multiple siren sounds for a motorized emergency vehicle comprising:

providing a multiple sound siren circuit in a microprocessor;

providing means for selecting various multiple sounds of said multiple sound siren circuit;

providing indicating means connected to the park/neutral position of said emergency vehicle transmission;

providing a circuit with said microprocessor for disabling said multiple sound siren when said park or neutral position is selected and indicated by said indicating means; and, maintaining said disabled condition of said multiple sound siren after said park or neutral position of said transmission has been changed to a drive or operative position of the transmission of said emergency vehicle.

13. The method as claimed in claim 12 further comprising:

indicating means formed as a switch means operatively connected to the transmission of the emergency vehicle for indicating when said transmission of the emergency vehicle is placed in a park or neutral position;

providing a signal to said disabling circuit as to the position of said switch means; and, maintaining the disabling of said multiple sound siren by an output from said disabling circuit to said multiple sound siren that is also connected to said means for selecting multiple sounds.

14. The method as claimed in claim 13 further comprising:

providing switch means in the form of a multiple selector switch which has a break to make contact for selecting each of said multiple sound siren sounds; and, providing a pulse to said integrated circuit when said break to make position is moved so as to enable said multiple sound siren by means of said AND gates.

15. The method as claimed in claim 12 further comprising:

enabling said multiple sound siren after said disabled condition.

16. The method as claimed in claim 12 wherein:

said disabling circuit and maintaining said disabled condition is provided by said microprocessor.

17. The method as claimed in claim 15 wherein:

enabling said multiple sound siren is provided by said microprocessor.

* * * * *